(12) United States Patent
Hutchison, II et al.

(10) Patent No.: US 7,172,150 B1
(45) Date of Patent: Feb. 6, 2007

(54) RETRACTABLE REEL APPARATUS

(75) Inventors: Donald E. Hutchison, II, Mansfield, TX (US); Dallas W. Copley, Sapulpa, OK (US); Timothy R. Knust, Burleson, TX (US); Derrick W. Charbonnet, Arlington, TX (US)

(73) Assignee: Independent Solutions, Inc., Mansfield, TX (US)

( * ) Notice: Subject to any disclaimer, the term of this patent is extended or adjusted under 35 U.S.C. 154(b) by 164 days.

(21) Appl. No.: 10/627,410

(22) Filed: Jul. 25, 2003

Related U.S. Application Data

(60) Provisional application No. 60/398,951, filed on Jul. 26, 2002, provisional application No. 60/487,567, filed on Jul. 14, 2003.

(51) Int. Cl.
*B65H 75/48* (2006.01)

(52) U.S. Cl. .............................. 242/375.2; 242/378.2; 191/12.2 R

(58) Field of Classification Search ............. 242/375.2, 242/378.1, 378.2, 378.3, 377; 191/12.2 R, 191/12.4
See application file for complete search history.

(56) References Cited

U.S. PATENT DOCUMENTS

| | | | | |
|---|---|---|---|---|
| 1,868,409 A | * | 7/1932 | Crispen | 242/378.2 |
| 3,409,246 A | * | 11/1968 | De Pas | 242/378.2 |
| 3,657,491 A | * | 4/1972 | Ryder et al. | 191/12.2 R |
| 3,959,608 A | * | 5/1976 | Finlayson et al. | 191/12.2 R |
| 4,088,280 A | * | 5/1978 | Arlauskas et al. | 242/375.2 |
| 4,280,672 A | * | 7/1981 | Santos et al. | 242/534.2 |
| 4,363,171 A | * | 12/1982 | Scandella | 242/375.2 |
| 4,757,955 A | * | 7/1988 | Simmons | 191/12.2 R |
| 5,094,396 A | * | 3/1992 | Burke | 242/378.2 |
| 5,114,091 A | | 5/1992 | Peterson et al. | |
| 5,129,828 A | | 7/1992 | Bass | |
| 5,230,481 A | | 7/1993 | Wheeler et al. | |
| 5,641,067 A | * | 6/1997 | Ellis | 206/409 |
| 5,655,726 A | | 8/1997 | Peterson et al. | |
| 5,797,558 A | | 8/1998 | Peterson et al. | |
| 5,855,262 A | * | 1/1999 | Jackson | 191/12.4 |
| 6,035,983 A | * | 3/2000 | Benner | 191/12.2 R |
| 6,616,080 B1 | * | 9/2003 | Edwards et al. | 242/378.1 |
| 2002/0074442 A1 | * | 6/2002 | Liao | 242/378.1 |
| 2002/0171000 A1 | * | 11/2002 | Liao | 242/378.1 |
| 2005/0161548 A1 | * | 7/2005 | Naneff et al. | 242/385 |

* cited by examiner

*Primary Examiner*—Kathy Matecki
(74) *Attorney, Agent, or Firm*—McAfee & Taft

(57) ABSTRACT

A retractable reel apparatus for connecting the electrical wiring on a trailer to the electrical system of a towing vehicle. The apparatus comprises a housing with a reel rotatably disposed therein. A wire has a first portion wrapped in a first direction around the reel and a second portion counter-wrapped in a second direction within the first portion. A first end of the wire extends through a first opening in the apparatus, and a second end of the wire extends through a second opening. The second end of the wire is stationary. By pulling on the first end of the wire, the first end may be extended from the housing. A torsion spring biases the reel so that the wire tends to retract back into the housing when tension on the first end of the wire is released. Numerous mounting arrangements for the apparatus are disclosed.

62 Claims, 10 Drawing Sheets

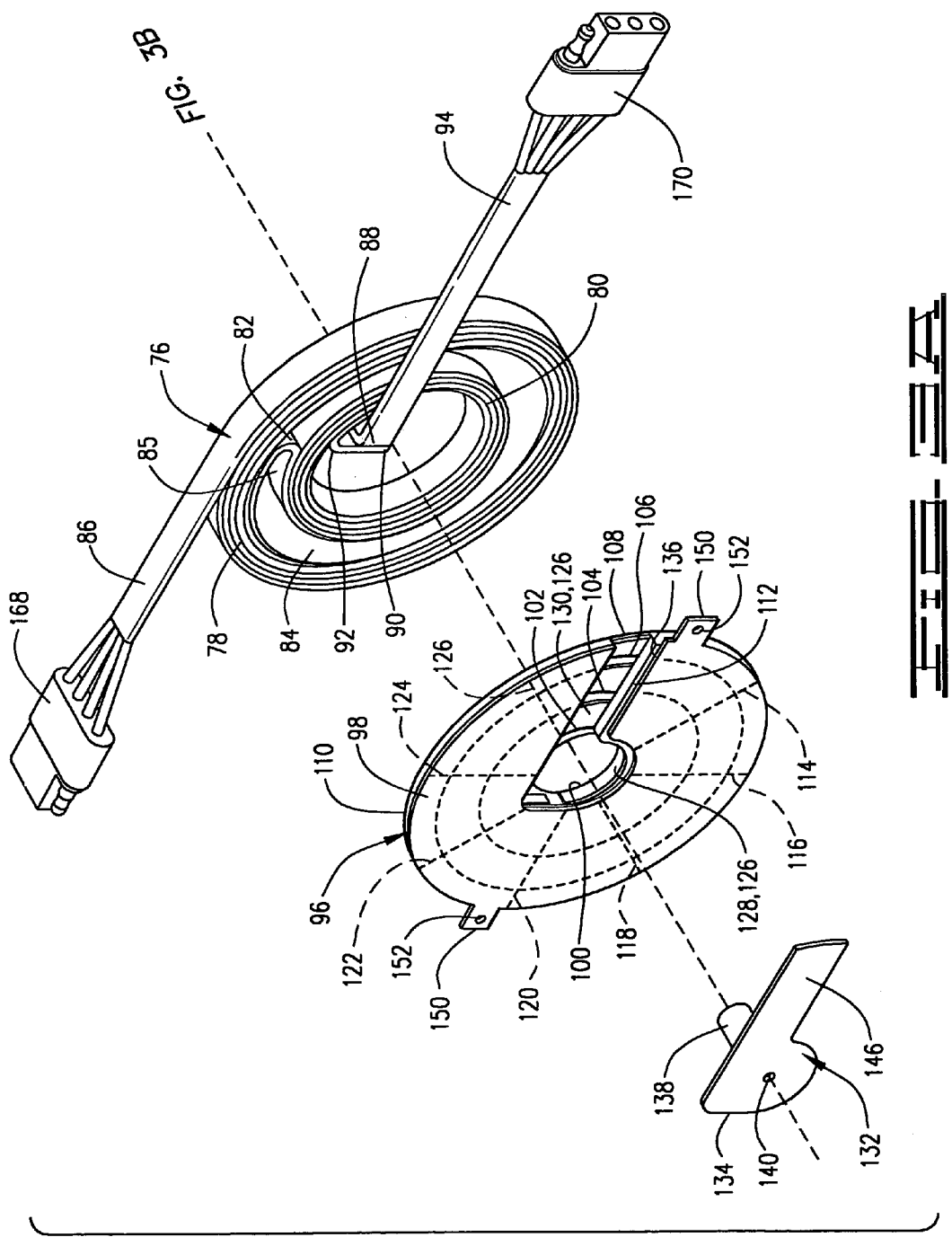

RETRACTABLE REEL APPARATUS

CROSS-REFERENCE TO RELATED APPLICATION

This application claims the benefit under Title 35, United States Code, § 119(e) of U.S. Provisional Application Ser. No. 60/398,951 filed Jul. 26, 2002, and U.S. Provisional Application Ser. No. 60/487,567 filed Jul. 14, 2003.

BACKGROUND OF THE INVENTION

1. Field of the Invention

This invention relates to retractable reels for single or multi-line electrical wiring, cords, cables, hoses, and the like, and more particularly to a retractable reel with a continuous length of wiring having a first portion thereof wrapped around a spring-biased reel in a housing and a second portion thereof counter-wrapped within the reel, thus eliminating the necessity for a central shaft, and so that the first portion may be pulled out of the housing, thereby rotating the reel, without applying tension or stress on the second portion. The invention is particularly well adapted for use on wiring for trailers pulled behind vehicles and is designed to connect the trailer wiring to a power source on the vehicle.

2. Description of the Prior Art

It is well known that extremely elongated flexible items such as electrical wires, cords, cables, hoses and the like are often wound onto reels for storage. Future reference to such electrical wires, cords, cables, hoses and the like will simply be referred to as "wires." Storage of wires on reels not only makes the wire take up less space, but the winding onto the reel also substantially prevents the wire from becoming entangled which essentially makes it much easier to handle when it is desired to use it.

Sometimes, the reels are enclosed in a housing or case with one or both ends of the wire protruding from the housing. By pulling on the end or ends, the wire is unwound from the reel and extended away from the housing. The reels may be spring-biased to tend to rotate the reel in a direction to wind the wire thereon, so that if a free end of a wire is released, it will be retracted back into the housing.

Some devices of this type are disclosed in U.S. Pat. No. 5,230,481 to Wheeler, et al., and U.S. Pat. Nos. 5,114,091; 5,655,726; and 5,797,558 to Peterson, et al. Each of these discloses a cord take-up device for flat wire such as used in current telephone cables. Both dual and unidirectional cord take-ups are disclosed. Each of these devices, being used for telephone cables, is relatively lightweight and not necessarily adaptable to more rigorous use, such as for holding the heavier type of wiring found on a vehicle trailer. Of course, a vehicle trailer is exposed to the elements and is a much harsher environment than most telephone cords encounter. The present invention is of more substantial construction and has a unique method of positioning the cable in the apparatus.

When pulling a trailer behind a vehicle, it is often desired or even legally necessary to connect electrical equipment on the trailer to the electrical system of the vehicle. Electrical equipment on the trailer typically includes taillights, brake lights, turn signals, license plate lights, running lights, etc. Some trailers are also equipped with electric brakes and/or other electrical items. The wiring on the trailer will have plug that fits in a socket on the vehicle, or vice versa, so that all of the electrical connections can be made easily at once. Depending on the positioning of the plugs in the wiring, there may be excess wiring which can hang down from the trailer or between the vehicles. Not only is this unsightly, it can be hazardous if the wire were to catch on something as the vehicle pulls the trailer down the road. It could result in the wiring becoming disconnected which would cause loss of lights, etc., and possibly the trailer brakes. The present invention solves this problem by providing a spring-biased retractable reel apparatus so that any excess wire is simply pulled back into a housing by action of a spring after the connection to the vehicle has been made.

Such interconnecting plug receptacles are commonly used on a great variety of trailers, such as utility, horse, livestock, automotive, recreational and bumper pull trailers. While there has been some standardization of these interconnecting plug receptacles, the present invention can be adapted to any of them, and is not intended to be limited to any particular plug receptacle or trailer configuration.

One rewind trailer-like connector is disclosed in U.S. Pat. No. 5,129,828 to Bass which is mounted using the same hitch bolt that holds the hitch ball on a towing vehicle. One end of the wire in the housing of the apparatus of Bass may be pulled away from the housing and is spring-loaded to tend to pull it back in. A potential problem with the Bass apparatus is that is has no means to keep the stationary side of the wire from twisting. The stationary wire cannot rotate. Therefore, it must twist, causing repetitive tension in the wire, shortening its life, or a swivel connection must be used.

Another problem with the Bass apparatus is that the internal coil spring is adjacent to the electric wiring itself. This results in the potential problem that the spring could cut the insulation on the wiring which could lead to electrical shorts. The present invention solves this problem by having the internal spring separated from the wiring by a side of the reel in the housing so that the insulation and integrity of the wiring is protected from contact by the spring.

An additional problem with the Bass apparatus is that it is designed for round wire. Typically, numerous trailers use a flat wire configuration. Such wiring could not be wound into the Bass apparatus without considerable changes in the design of the apparatus. The present invention solves this problem by providing a retractable reel apparatus usable for such flat wires, but also adaptable for round wire applications.

SUMMARY OF THE INVENTION

The present invention is a retractable reel apparatus for use in handling a variety of elongated items such as electrical wires, cords, hoses and the like which can be wound onto a reel for storage. More specifically, but not by way of limitation, the apparatus is well adapted for use in connecting the electrical wiring on a trailer with the electrical system on a vehicle used to tow the trailer.

The invention can be described as a retractable reel apparatus comprising a housing, a reel rotatably disposed in the housing wherein the reel has a cylindrical portion, and a wire having a first portion disposed around the cylindrical portion and a second portion disposed inside the cylindrical portion. Preferably, the first portion of the wire is wrapped in a first direction, and the second portion of the wire is wrapped in a second direction. The first and second directions are preferably opposite one another, and the first and second portions of the wire are interconnected by a substantially 180° bend or loop. Stated in another way, the second portion of the wire is counter-wrapped with respect to the first portion of the wire. This is sometimes referred to herein as a "traversing wire loop configuration."

The retractable reel apparatus further comprises a spring biasing the reel in a direction tending to wind up the first portion of the wire. Preferably, the spring is spaced from the wire. In the illustrated embodiment, the reel has a disc portion adjacent to the cylindrical portion, and the wire and spring are disposed on opposite sides of the disc portion.

The housing defines first and second openings therein. The first portion of the wire extends through the first opening, and the second end of the wire extends through the second opening.

The housing preferably further comprises a cylindrical portion and a side wall. A cover is positioned adjacent to an end of the cylindrical portion of the housing opposite the side wall thereof. The first opening in the housing is defined in the cylindrical portion and extends generally tangentially thereto. The second opening is defined between the housing adjacent to the cover. The second opening is substantially perpendicular to an axis of the housing.

The second portion of the wire is at least partially positioned in a slot defined in the cover. A cover insert covers at least a portion of the slot.

In an alternate embodiment, the second end of the wire extends through a slot defined in the cover and is substantially perpendicular to the cover.

A brush may be disposed in the first opening in the housing and in wiping contact with the first portion of the wire.

The housing has a mounting lug thereon to facilitate mounting the apparatus on a surface such as a tongue of a trailer.

The present invention may also be described as a retractable reel apparatus comprising a housing which comprises a side wall, a spring guide extending from the side wall and having an end, and a housing spring tab extending from the side wall. The apparatus further comprise a torsion spring positioned in the housing adjacent to the side wall and around the spring guide, and a reel rotatably disposed in the housing adjacent to the spring and comprising a reel spring tab thereon. The spring has an outer end initially engaging the housing spring tab and an inner end engaging the end of the spring guide. The reel spring tab is spaced radially inwardly from the housing spring tab. When the reel is rotated in the housing, the spring tab will engage a portion of the spring adjacent to the outer end thereof such that the outer end of the spring is disengaged from the housing spring tab and engaged only with the reel spring tab. Thereafter, the outer end of the spring is engaged with the reel spring tab, and the inner end of the spring remains engaged with the end of the spring guide such that rotation of the reel within the housing applies torsion to the spring for biasing the reel in the opposite direction.

The outer and inner ends of the spring are substantially U-shaped. The spring is made of stainless steel.

The wire has a first portion wrapped in a first direction around the reel and a second portion counter-wrapped in a second direction within the first portion. Pulling an end of the first portion of the wire tends to rotate the reel. An end of the second portion is substantially stationary.

One advantage of the invention is that it provides for winding a line onto a reel in a housing but does not require a rotary connection at the center of the reel. That is, the necessary rotation of the reel is accommodated by counter-wrapping a portion of the line around the axle of the reel, a line for pre-movement of the line in and out of the housing. Another advantage of the present invention is that it allows for a continuous line or lines to be wound into the apparatus during assembly such that a specified length of line can be pulled out and retracted during use without damaging the line.

An additional advantage of the present invention is that the housing thereof provides protection of the wire therein from the elements. Not only do the housing and cover protect the wiring from the weather, the entire apparatus may be intermittently submersed in water, such as when a boat is loaded or unloaded from a trailer. Because of the unique transverse wire loop configuration and the use of corrosion-resistant materials the apparatus is substantially weather resistant.

A further advantage of the invention is that it does not require use of guidance rods, wheels or grooved axles to align the wire because of the overlay configuration of the wiring on the reel.

Still another advantage of the present invention is that it can be mounted in virtually any position on either the trailer tongue or other structural elements of the trailer. The apparatus is also adaptable for mounting on the vehicle rather than the trailer.

Numerous additional objects and advantages of the invention will become apparent as the following detailed description of the preferred embodiment is read in conjunction with the drawings illustrating such embodiment.

BRIEF DESCRIPTION OF THE DRAWINGS

FIGS. 3A and 3B present an exploded, perspective view of the apparatus.

DETAILED DESCRIPTION OF THE PREFERRED EMBODIMENT

Figure 1:
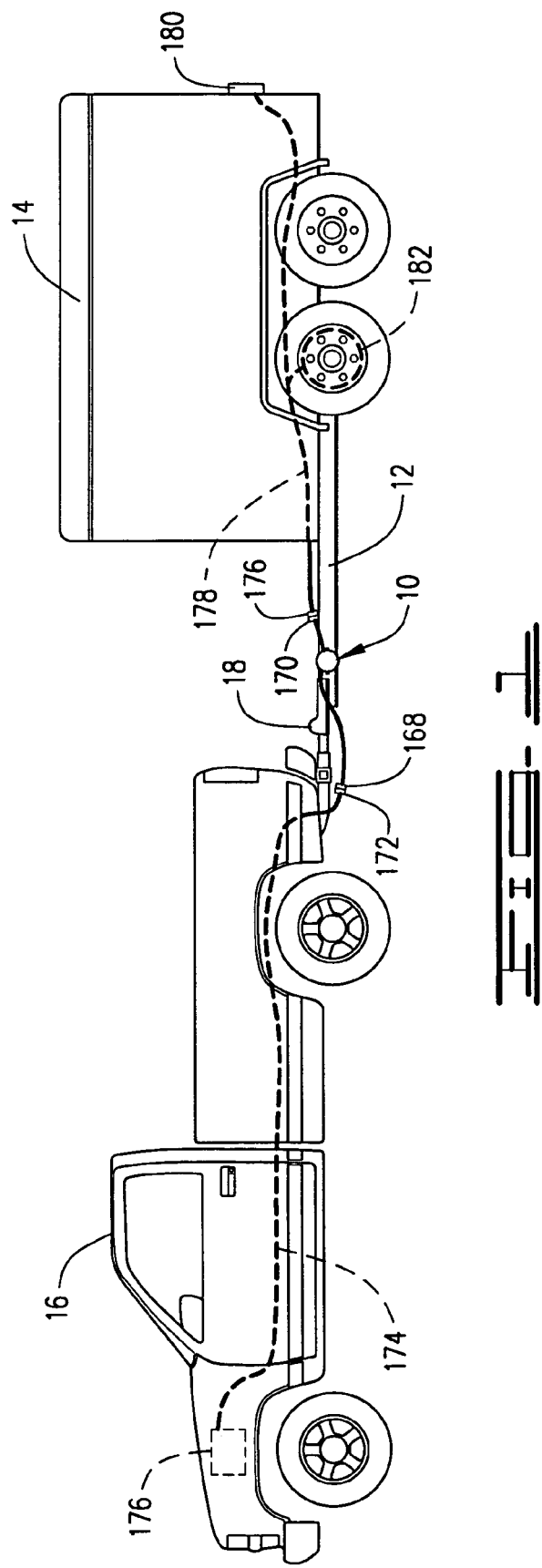
FIG. 1 shows the retractable reel apparatus of the present invention in position mounted on the tongue of a trailer hitched to a towing vehicle.
Figure 2:
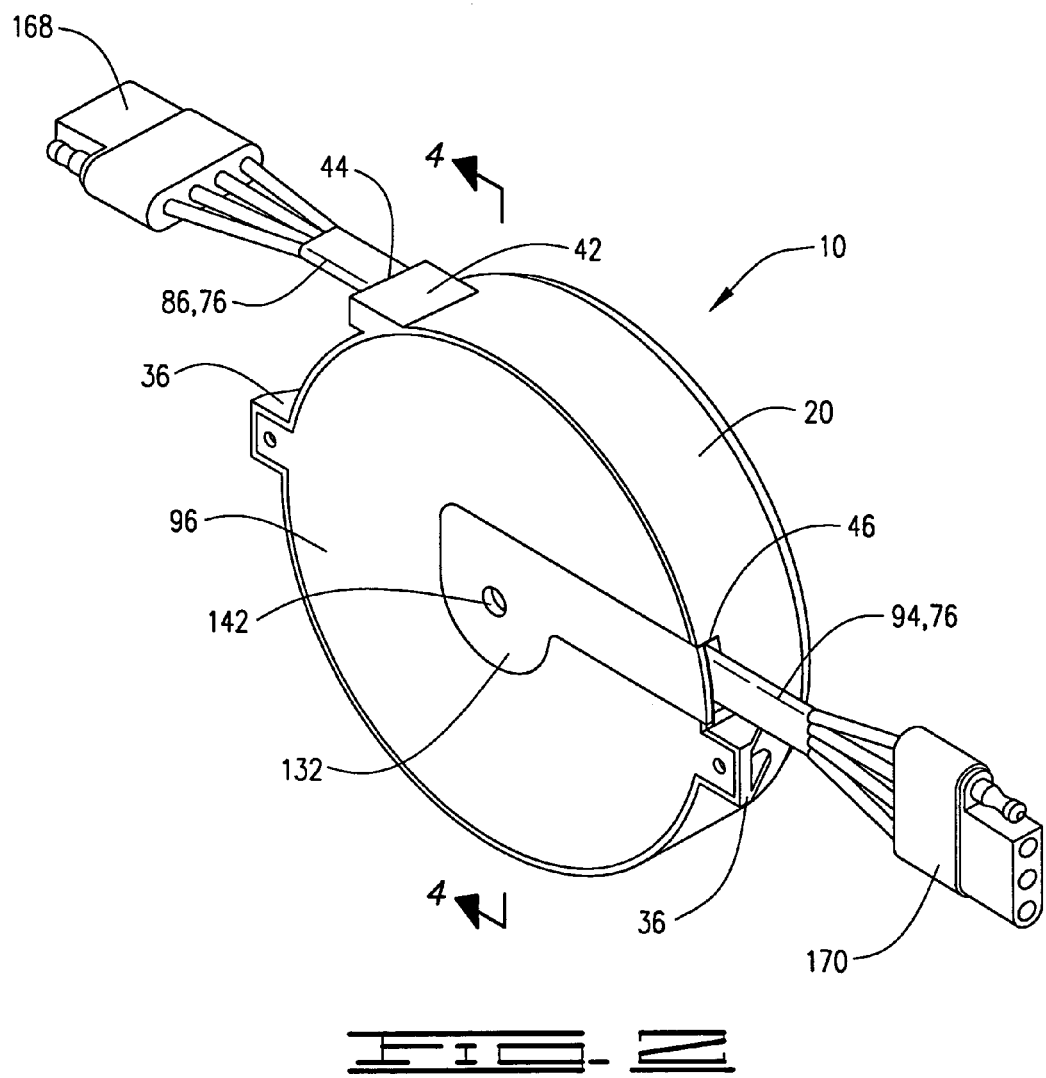
FIG. 2 shows a perspective view of the apparatus.
Figure 3A:
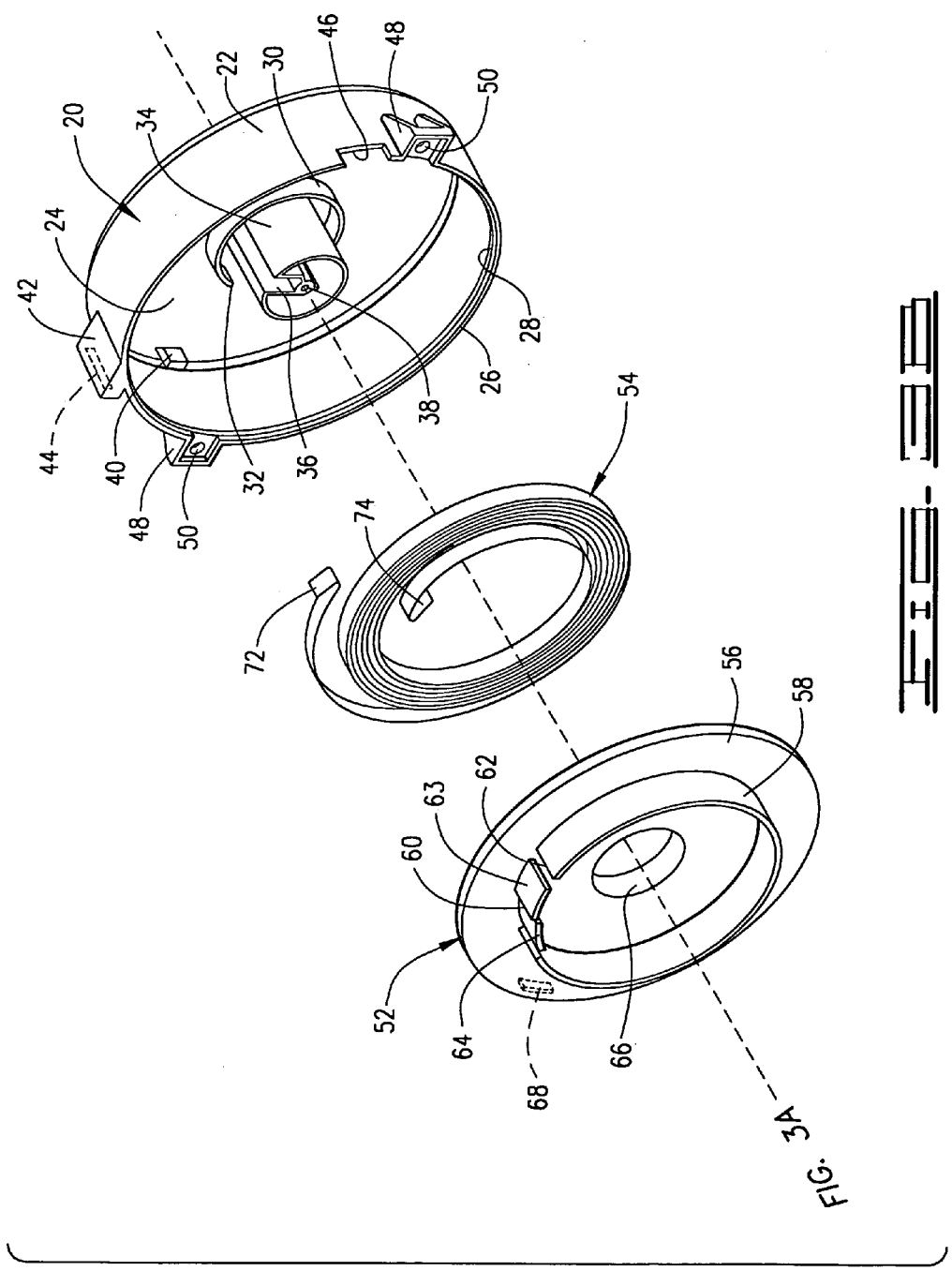

Referring now to the drawings, and more particularly to FIG. 1, the retractable reel apparatus of the present invention is shown and generally designated by the numeral 10. Apparatus 10 is shown mounted to a tongue 12 of a trailer 14. See also FIG. 13. Trailer 14 is connected to the rear of a vehicle 16 by a hitch 18 of a kind known in the art.

Referring also to FIGS. 2, 3A, 3B and 4, apparatus 10 comprises an outer housing 20 having a substantially cylindrical portion 22 and an end wall 24 closing one end of the cylindrical portion. The opposite side of cylindrical portion 22 has an edge 26 defining an annular notch 28 therein.

A cylindrical spring guide 30 extends inwardly from side wall 24 and is substantially concentric with cylindrical portion 22, but has a narrower width. Spring guide 30 does not form a complete circle and thus has a pair of ends 32.

Also extending inwardly from end wall 24 of housing 20 is a generally cylindrical hub 34 having a width between that of spring guide 30 and cylindrical portion 22. Hub 34 has a slot 36 extending radially inwardly therein. Adjacent to slot 36 housing 20 defines a central hole 38 therein.

Housing 20 has a housing spring tab 40 therein which extends substantially perpendicular to end wall 24 and has a length substantially equal to the width of spring guide 30 or a little less.

Housing 20 has an extension 42 extending from cylindrical portion 22 thereof and has a substantially rectangular cross section. Extension 42 defines a first opening 44 therethrough. It will be seen that the plane of first opening 44 is substantially parallel to the axis of hole 38. A second opening 46 is formed in edge 26 of cylindrical portion 22. It will be seen that second opening 46 is oriented substantially perpendicular to first opening 44.

Housing 20 further has a pair of mounting lugs, each of which define a mounting hole 50 therethrough. These are used with bolts of a kind known in the art to mount apparatus 10 to any desired surface such as tongue 12 of trailer 14.

A reel or wheel 52 is rotatably positioned in housing 20, and a torsion spring 54 is disposed between reel 52 and end wall 24 of housing 20, as will be further described herein.

Reel 52 has a disc portion 56 with a wire guide 58 extending substantially perpendicular to one side of the disc portion. Wire guide 58 has an arcuate configuration defining a wide gap 60 and a narrow gap 62, thus forming an outer arcuate tab 63. Adjacent to wide gap 60 is an inner arcuate tab 64 which is substantially concentric with wire guide 58 but has a smaller radius.

Reel 52 also has a central opening 66 which is adapted to fit rotatably around hub 34 in housing 20.

On an opposite side of disc portion 56 from wire guide 58 is a reel spring tab 68. Reel spring tab 68 has substantially the same length as housing spring tab 40. Reel spring tab 68 is spaced radially inwardly from housing spring tab 40 so they do not interfere with one another as reel 52 is rotated within housing 20 as will be further discussed herein.

When reel 52 is disposed in housing 20, disc portion 56 thereof engages spring guide 30. It will thus be seen that an annular cavity 70 is formed by reel 52 and housing 20, and spring 54 is disposed in this cavity.

Torsion spring 54 is of generally conventional construction in that it is formed of flat spring wire. Preferably, but not by way of limitation, this spring wire is made of stainless steel. As best seen in FIG. 3B, torsion spring 54 is coiled and has a U-shaped outer end 72 and a U-shaped inner end 74. It will be seen that spring 54 thus fits generally annularly around spring guide 30.

During assembly of apparatus 10, inner end 74 of spring 54 is hooked around one end 32 of spring guide 30, and outer end 72 is hooked around housing spring tab 40 so that the spring is located within housing 20. This temporary positioning of spring 54 is only for ease of assembly. Reel 52 is then positioned in housing 20. Reel 52 is rotated counterclockwise as seen in FIG. 3 until reel spring tab 68 engages the outer surface of spring 52 adjacent to outer end 72 thereof and to housing spring tab 40. Further counterclockwise rotation of reel 52 will move reel spring tab 68 by housing spring tab 40 and will thus move reel spring tab 68 into U-shaped outer end 72 and pull it out of engagement from housing spring tab 40. Thereafter, the tension in spring 54 will keep it in an operating position in which inner end 74 thereof is engaged with end 32 of spring guide 30 and outer end 72 engaged with reel spring tab 68.

In this way, it is not necessary to try to stab reel spring tab blindly into outer end 72 of spring 54 which would be very difficult if not impossible.

Figure 8:
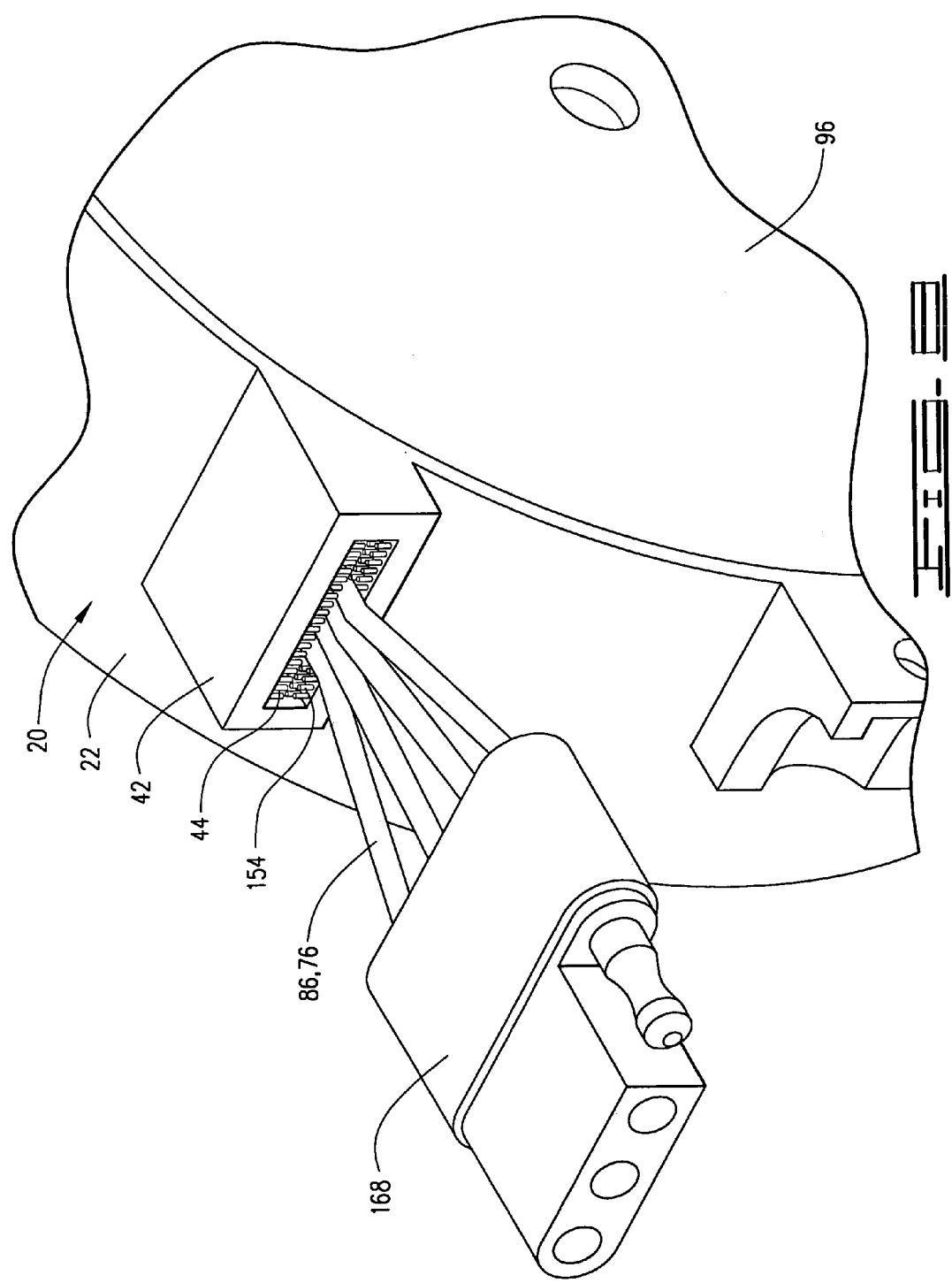
FIG. 8 shows a detail of the first opening through which the wire is extended and retracted.

It will be seen further by those skilled in the art that counterclockwise rotation of reel 52 within housing 20 will apply torsion to spring 54, causing it to wind onto itself to increase the tension thereon. Thus, torsion spring 54 tends to bias reel 52 in a clockwise direction. See also FIG. 8.

Figure 5:
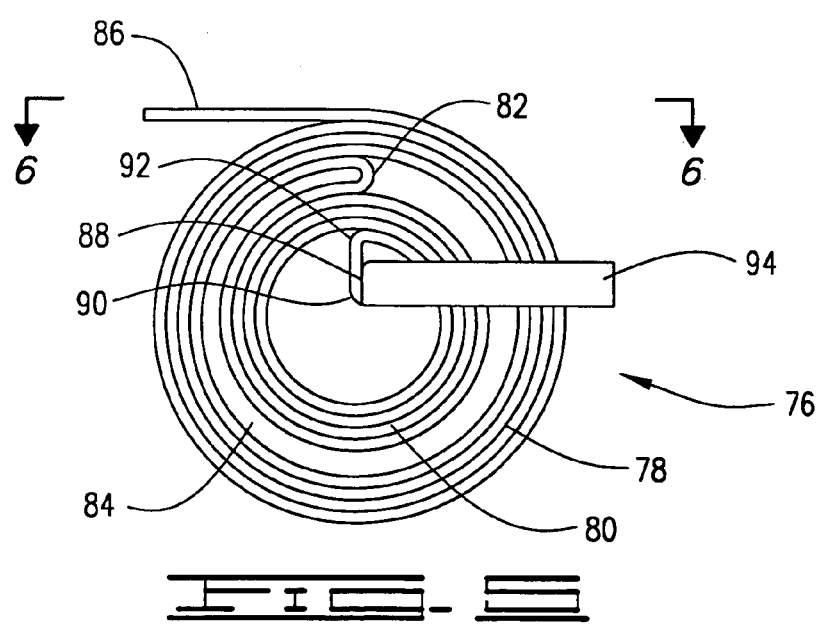
FIG. 5 is a side view of the wire.
Figure 6:
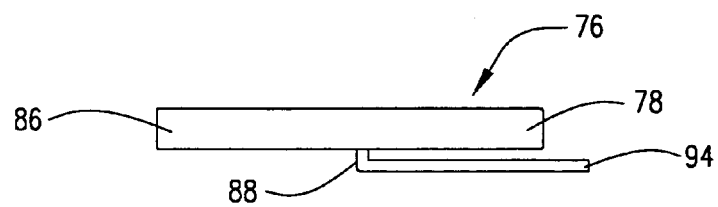
FIG. 6 is an edge view of the wire.
Figure 7:
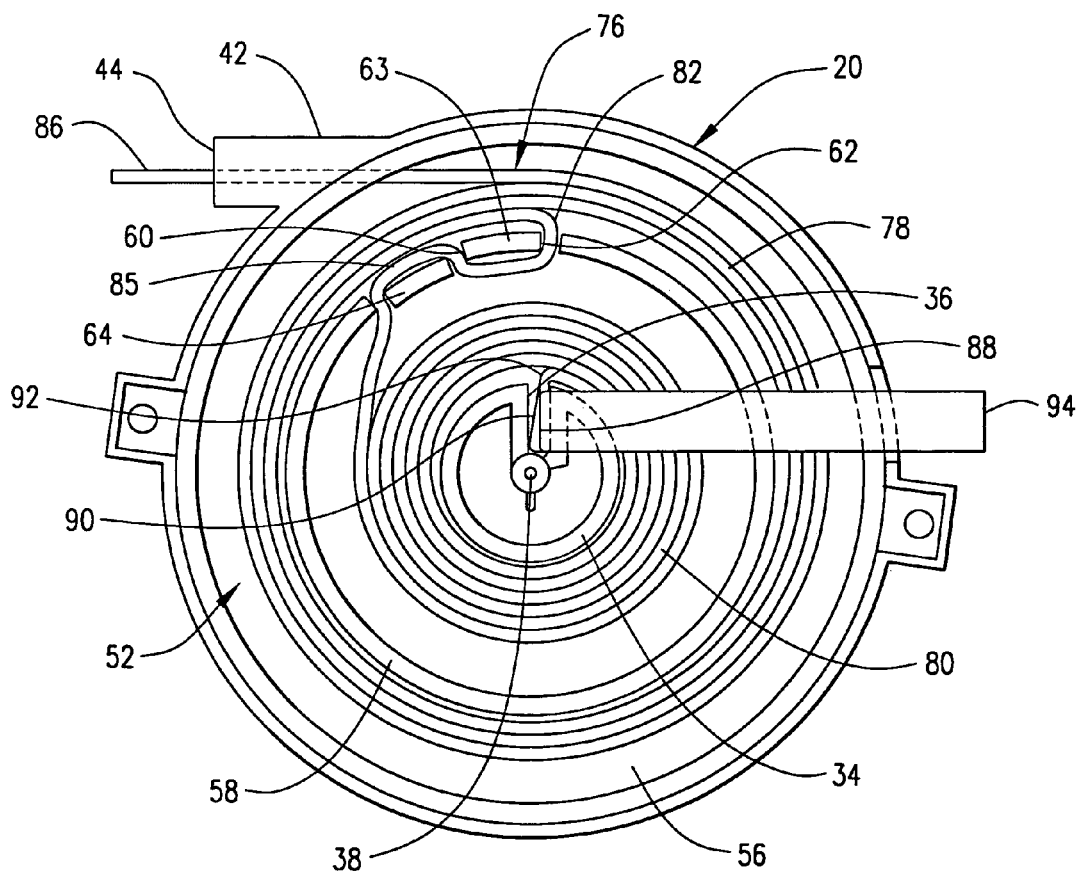
FIG. 7 shows a detail of the configuration of the wiring as it is positioned on the reel in the housing.

Referring also to FIGS. 5–7, a wire 76 is disposed in housing 20 adjacent to reel 52 on an opposite side thereof from torsion spring 54. Wire 76 is preferably of flat configuration, such as the flat four-strand wiring used in numerous trailers. Wire 76 has an outer first portion 78 in which the wire is wrapped in a first direction and an inner second portion 80 wrapped in a second direction opposite to the first direction. In order to wind first and second portions 78 and 80 in opposite directions, a 180° bend or loop 82 must be formed by the wire. Second portion 80 of wire 76 is substantially concentric with first portion 78 and is spaced radially inwardly from the first portion. Thus, an annular gap 84 is defined between first portion 78 and second portion 80 of wire 76. First and second portions 78 and 80 are interconnected by bend 82 which extends across annular gap 84.

When wire 76 is positioned in housing 20, wire guide 58 on reel 52 extends into annular gap 84. An outermost section 85 of second portion 80 of wire 76 adjacent to bend 82 is passed through narrow gap 62, inside of outer arcuate tab 63, into gap 60 and around the outside of inner arcuate tab 64. As best seen in FIG. 7, this locks wire 76 in place on reel 52 so that bend 82 rotates with the reel.

An extendable first end 86 of wire 76 extends from the outside of first portion 78 and through first opening 44 in housing 20. Those skilled in the art will see that first end 86 extends generally tangentially with respect to first portion 78 of wire 76.

On the inside of second portion 80 of wire 76, the wire forms a 90° bend 88, a diagonal 180° bend 90 and a 90° bend 92. Thus, an inner second end 94 of wire 76 extends parallel to the edges of first and second portions 78 and 80 and in a plane substantially perpendicular to that of first end 86. Second end 94 extends through second opening 46 in housing 20. The portion of wire 76 formed by the bends is tucked into slot 36 in housing 20 to keep second end 94 of wire 76 from moving. In other words, second end 94 of wire 76 is stationary.

A cover 96 closes the open side of cylindrical portion 22 of housing 20. Cover 96 has a disc portion 98 defining a central opening 100 therethrough with reinforcing ribs on an inner side of the disc portion. These reinforcing ribs include a plurality of concentric reinforcing ribs 102, 104, 106 and 108. Innermost concentric rib 102 partially defines central opening 100. Outermost concentric rib 108 is adapted to fit in notch 28 in cylindrical portion 22 of housing 20. Disc portion 98 of cover 96 extends radially outwardly from outermost concentric rib 108 such that an annular lip 110 is formed. It will be seen that lip 110 will engage or fit closely next to edge 26 of cylindrical portion 22 of housing 20. A plurality of radial reinforcing ribs 112, 114, 116, 118, 120, 122 and 124 extend between innermost concentric rib 102 and outermost concentric rib 108 and intersect concentric ribs 104 and 106.

Cover 96 is spaced from end wall 24 of housing 20 such that reel 52 with wire 76 wrapped thereon is free to rotate within the housing.

Figure 4:
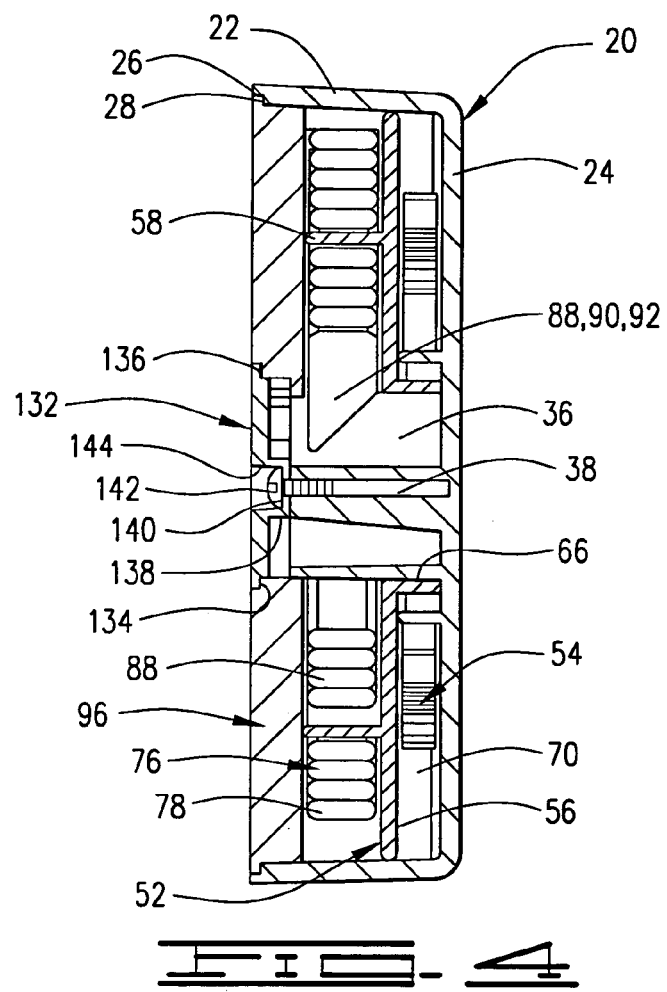
FIG. 4 is a vertical cross section taken along lines 4—4 in FIG. 2.

Cover 96 has a recess or slot 126 formed therein. Recess 126 is generally shaped like a lowercase letter "b" having a curved portion 128 and a straight portion 130. Curved portion 128 is contiguous with part of central opening 100 in cover 96. It will be seen that straight portion 130 is bounded in part by segments of concentric ribs 102, 104, 106 and 108. Second end 94 of wire 76 lies flatly within recess 126 and is covered by a cover insert 132 which has an outer perimeter substantially the same shape as recess 126 and is adapted to fit within the recess. A lip 134 on cover insert 132 fits adjacent to a groove 136 formed along the edge of recess 126. A central post 138 extends inwardly on cover insert 132 and is substantially coaxial with hub 34 in housing 20. Post 138 defines a hole 140 axially therethrough which is aligned with hole 38 in housing 20. As seen in FIG. 4, a fastener 142, such as a self-tapping screw extends through hole 140 in cover insert 132 and threadingly engages hole 38 in housing 20. The head of fastener 142 fits in cylindrical recess 144 in cover insert 132. It will be seen by those skilled in the art that the outer surfaces of cover 96 and cover insert 132 are substantially coplanar and flush.

A straight portion 146 of cover insert 132 encloses second end 94 of wire 76.

Cover 96 has a pair of radially outwardly extending tabs 150, each of which defines a hole 152 therethrough. Each tab 150 is adapted to fit into a corresponding mounting lug 48 on housing 20, and holes 152 are aligned with corresponding holes 50.

Referring again to FIG. 8, a wiper in the form of a plurality of brushes 154 engages first end 86 of wire 76. Brushes 154 are used to wipe first end 86 of wire 76 as it is retracted back into housing 20, thus cleaning the wire and substantially preventing foreign matter from entering housing 20 through first opening 144.

Figure 9:
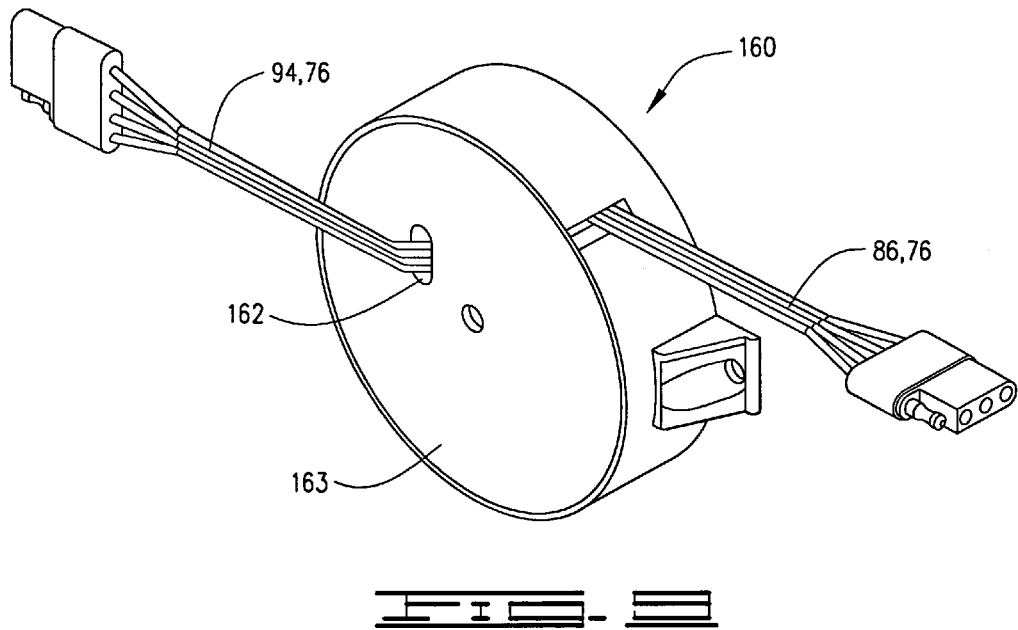
FIG. 9 shows a second embodiment of the retractable reel apparatus.

FIG. 9 shows a second embodiment of the retractable reel apparatus of the present invention, generally designated by the numeral 160. The construction of second embodiment apparatus 160 is similar to first embodiment apparatus 10, but in the case of the second embodiment, a slot 162 is formed in a cover 163. Second end 94 of wire 76 extends through slot 162.

Figure 10:
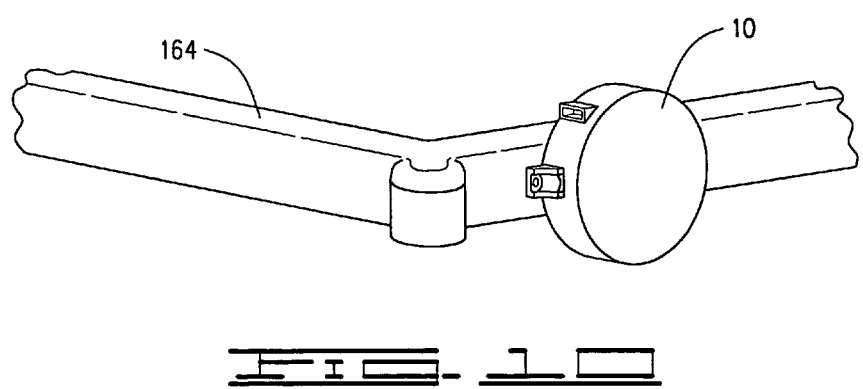
FIG. 10 illustrates a second mounting position of the apparatus.
Figure 11:
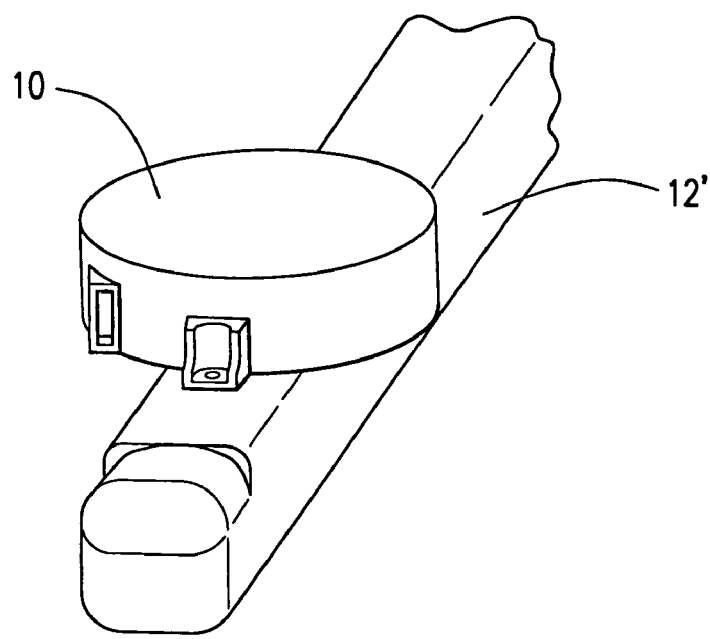
FIG. 11 shows a third mounting position of the apparatus.
Figure 12:
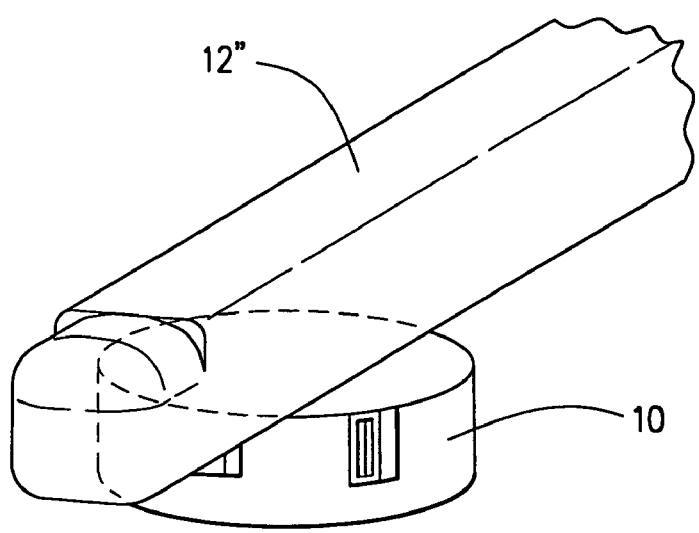
FIG. 12 illustrates a fourth mounting position of the apparatus.
Figure 13:
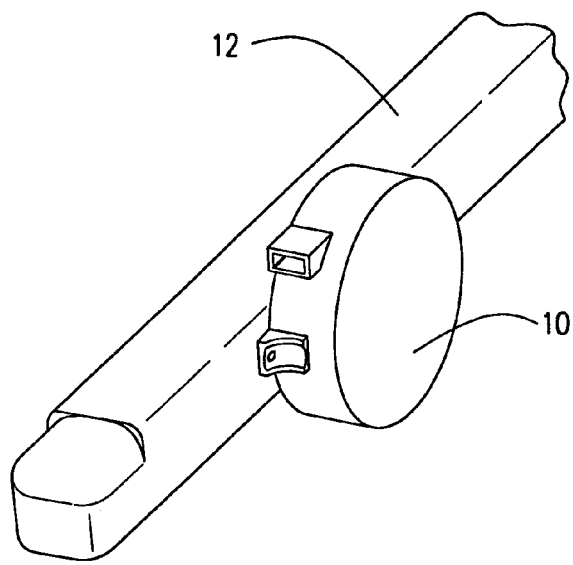
FIG. 13 is a detail of the mounting shown in FIG. 1.
Figure 14:
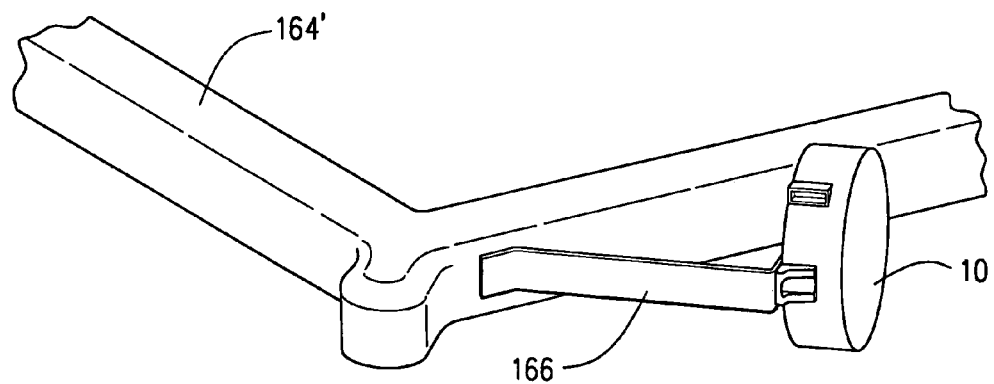
FIG. 14 illustrates a fifth mounting position of the apparatus.

As illustrated in FIG. 1, apparatus 10 is attached to a straight tongue 12 of a trailer 14 as previously described herein. A detail of this is shown in FIG. 13. However, the versatility of apparatus 10 allows it to be mounted in a number of other ways as well. FIG. 10 shows apparatus 10 on a substantially V-shaped tongue 164. FIG. 11 shows apparatus 10 mounted on top of a straight tongue 12'. FIG. 12 shows apparatus 10 attached to the bottom side of a straight tongue 12". FIG. 14 illustrates the attachment of apparatus 10 to a V-shaped tongue 164' by means of a substantially L-shaped bracket 166 such that apparatus 10 is substantially parallel to a longitudinal axis of the trailer and towing vehicle. Numerous other mounting arrangements could also be used, and the invention is not intended to be limited to those mounting positions illustrated herein. For example, but not by way of limitation, apparatus 10 could also be attached to vehicle 16 rather than trailer 12.

Referring again to FIGS. 1, 2, 3A and 3B, a first plug 168 of a kind known in the art is attached to first end 86 of wire 76. Similarly, a second plug 170 is attached to second end 94 of wire 76. As seen in FIG. 1, first plug 168 is adapted for engagement with a first connector 172 attached to electrical system 174 of vehicle 16. Electrical system 174 is in communication with a power source 176 on vehicle 16, such as the vehicle battery.

Second plug 170 is adapted for engagement with a second connector 176 which is part of electrical system 178 on trailer 14. Electrical system 178 on trailer 14 can include items such as lights 180 and electrical brakes 182. As previously described herein, numerous other electrical components could form a portion of electrical system 178, and the invention is not intended to be limited to the configuration shown in FIG. 1.

OPERATION OF THE INVENTION

When apparatus 10 is mounted on tongue 12 as shown in FIGS. 1 and 13 or in an alternate manner such as shown in FIGS. 10–12 and 14, second plug 170 on stationary second end 94 of wire 76 is engaged with second connector 176 on trailer 14.

When it is desired to tow trailer 14 behind vehicle 16, trailer 14 is connected to vehicle 16 using hitch 18 in a manner known in the art. First end 86 of wire 76 is extended from housing 20 by pulling on first plug 168, and the first plug is engaged with first connector 172 as previously described herein. It will be seen by those skilled in the art that this extension of first end 86 of wire 76 will result in rotation of reel 52, thereby increasing the tension on torsion spring 54 as previously described. Because of the unique configuration of wire 76 in which first portion 78 of the wire is wrapped in one direction and second portion 80 of the wire is counter-wrapped in the opposite direction, the rotation of reel 52 cannot apply any tension to second portion 80 of wire 76, and, in fact, tends to unwind it. Thus, no tension is ever applied to second end 94 of wire 76.

When it is desired to disconnect trailer 14 from vehicle 16, first plug 168 is disengaged from first connector 172, and spring 54 is allowed to pull first end 86 of wire 76 back into housing 20 by forcing reel 52 to turn back in an opposite direction to its original position. As first end 86 of wire 76 is thus retracted into housing 20, brushes 154 keep the wire clean as previously described.

It will be seen, therefore, that the retractable reel apparatus of the present invention is well adapted to carry out the ends and advantages mentioned as well as those inherent therein. While presently preferred embodiments of the apparatus have been described for the purposes of this disclosure, numerous changes in the arrangement and construction of the parts may be made by those skilled in the art. All such changes are encompassed within the scope and spirit of the appended claims.

What is claimed is:

1. A retractable reel apparatus comprising:
   a housing;
   a reel rotatably disposed in the housing, the reel having a cylindrical portion, said reel further including an inner arcuate tab and an outer arcuate tab; and,
   a wire having a first portion disposed around the cylindrical portion and a second portion disposed inside the cylindrical portion, wherein the first and second portions of the wire are interconnected by a substantially 180° bend in the wire and whereby said tabs lock said wire on said reel and said substantially 180° bend rotates with said reel.

2. The apparatus of claim 1 wherein:
the first portion of the wire is wrapped in a first direction; and
the second portion of the wire is wrapped in a second direction.

3. The apparatus of claim 2 wherein said first and second directions are opposite one another.

4. The apparatus of claim 2 wherein the is flat.

5. The apparatus of claim 4 wherein the second portion of the wire comprises a 90° bend, a 180° bend and another 90° bend therein such that an end of the second portion is substantially perpendicular to an end of the first portion of the wire.

6. The apparatus of claim 1 further comprising a spring biasing the reel in a direction tending to wind up the first portion of the wire.

7. The apparatus of claim 6 wherein the spring is spaced from the wire.

8. The apparatus of claim 7 wherein:
the reel has a disc portion adjacent to the cylindrical portion; and
the wire and spring are disposed on opposite sides of the disc portion.

9. The apparatus of claim 1 wherein:
the housing defines first and second openings therein;
the first portion of the wire extends through the first opening; and
the second portion of the wire extends through the second opening.

10. The apparatus of claim 9 wherein the housing comprises:
a cylindrical portion; and
a side wall; and
further comprising a cover positioned adjacent to an end of the cylindrical portion of the housing opposite the side wall thereof.

11. The apparatus of claim 10 wherein the first opening is defined in the cylindrical portion of the housing and extends generally tangentially thereto.

12. The apparatus of claim 11 wherein the second opening is defined between the housing and the cover.

13. The apparatus of claim 12 wherein the second opening is substantially perpendicular to an axis of the housing.

14. The apparatus of claim 10 wherein the second portion of the wire is positioned in a slot defined in the cover.

15. The apparatus of claim 14 wherein the second portion of the wire extends through the slot and is substantially perpendicular to the cover.

16. The apparatus of claim 10 further comprising a brush disposed in the first opening and in wiping contact with the first portion of the wire.

17. The apparatus of claim 10 wherein the ends of the first and second portions of the wire are in planes substantially perpendicular to one another.

18. The apparatus of claim 1 wherein the housing has a mounting lug thereon.

19. A retractable wire apparatus comprising:
a housing;
a reel rotatably disposed in the housing;
a wire having a first portion wrapped in a first direction around the reel and a second portion counter-wrapped in a second direction within the first portion;
a cover adjacent to the housing, the cover defining a slot therein, wherein the second portion of the wire extends through the slot; and
a cover insert covering at least a portion of the slot.

20. The apparatus of claim 19 wherein said first and second portions are substantially concentric.

21. The apparatus of claim 19 wherein said first and second portions of the wire define an annulus therebetween.

22. The apparatus of claim 21 wherein the reel has a wire guide extending into the annulus.

23. The apparatus of claim 19 further comprising a spring biasing the reel in a direction tending to wind up the first portion of the wire.

24. The apparatus of claim 23 wherein the spring is spaced from the wire.

25. The apparatus of claim 24 wherein the reel comprises a disc portion; and
the wire and spring are disposed on opposite sides of the disc portion.

26. The apparatus of claim 19 wherein:
the housing defines first and second openings therein;
the first portion of the wire extends through the first opening; and
the second end of the wire extends through the second opening.

27. The apparatus of claim 26 wherein:
the housing comprises:
a cylindrical portion; and
a side wall; and
further comprising a cover positioned adjacent to an end of the cylindrical portion of the housing opposite the side wall thereof.

28. The apparatus of claim 27 wherein the first opening is defined in the cylindrical portion and extends generally tangentially thereto.

29. The apparatus of claim 28 wherein the second opening is defined between the housing and the cover.

30. The apparatus of claim 29 wherein the second opening is substantially perpendicular to an axis of the housing.

31. The apparatus of claim 27 wherein the second portion of the wire is positioned in a slot defined in the cover.

32. The apparatus of claim 27 wherein the second end of the wire extends through the slot and is substantially perpendicular to the cover.

33. The apparatus of claim 26 further comprising a brush disposed in the first opening and in wiping contact with the first portion of the wire.

34. The apparatus of claim 26 wherein the ends of the first and second portions of the wire are in planes substantially perpendicular to one another.

35. The apparatus of claim 19 wherein the housing has a mounting lug thereon.

36. A retractable reel apparatus comprising:
a housing comprising:
a side wall;
a spring guide extending from the side wall and having an end; and
a housing spring tab extending from the side wall;
a torsion spring positioned in the housing adjacent to the side wall and around the spring guide, the spring having an outer end initially engaging the housing spring tab and an inner end engaging the end of the spring guide;
a reel rotatably disposed in the housing adjacent to the spring and comprising a reel spring tab thereon, wherein:
the reel spring tab is spaced radially inwardly from the housing spring tab;
when the reel is rotated in the housing, the spring tab engages a portion of the spring adjacent to the outer end thereof such that the outer end of the spring is disengaged from the housing spring tab and engaged with the reel spring tab; and thereafter, the outer end of the spring is engaged with the reel spring tab, and the inner end of the spring remains engaged with the end of the spring guide such that further rotation of the reel within the housing applies torsion to the spring for biasing the reel in the opposite direction.

37. The apparatus of claim 36 wherein the outer and inner ends of the spring are substantially U-shaped.

38. The apparatus of claim 36 wherein the spring is made of stainless steel.

39. The apparatus of claim 36 further comprising a wire having a first portion wrapped in a first direction around the reel and a second portion counter-wrapped in a second direction within the first portion.

40. The apparatus of claim 39 wherein said first and second portions are substantially concentric.

41. The apparatus of claim 39 wherein said first and second portions of the wire define an annulus therebetween.

42. The apparatus of claim 41 wherein the reel has a wire guide extending into the annulus.

43. The apparatus of claim 39 wherein the spring is spaced from the wire.

44. The apparatus of claim 43 wherein the reel comprises a disc portion; and
the wire and spring are disposed on opposite sides of the disc portion.

45. The apparatus of claim 39 wherein pulling an end of the first portion of the wire tends to rotate the reel.

46. The apparatus of claim 39 wherein an end of the second portion is substantially stationary.

47. A retractable reel apparatus comprising:
a housing defining first and second openings therein and comprising a cylindrical portion and a side wall;
a reel rotatably disposed in the housing, the reel having a cylindrical portion;
a wire having a first portion disposed around the cylindrical portion of the reel and extending through the first opening and a second portion disposed inside the cylindrical portion of the reel and extending through the second opening;
a cover positioned adjacent to an end of the cylindrical portion of the housing opposite the side wall thereof, wherein the second portion of the wire is positioned in a slot defined in the cover; and
a cover insert covering at least a portion of the slot.

48. A retractable wire apparatus comprising:
a housing defining first and second openings therein and comprising a cylindrical portion and a side wall;
a reel rotatably disposed in the housing;
a wire having a first portion wrapped in a first direction around the reel and extending through the first opening and a second portion counter-wrapped in a second direction within the first portion and extending through the second opening;
a cover positioned adjacent to an end of the cylindrical portion of the housing opposite the side wall thereof, wherein the second portion of the wire is positioned in a slot defined in the cover; and
a cover insert covering at least a portion of the slot.

49. A retractable reel apparatus comprising:
a housing;
a reel rotatably disposed in the housing, the reel having a cylindrical portion defining a gap therein, said reel further including an inner arcuate tab and an outer arcuate tab; and
a flat wire having a first portion spirally wrapped in a first direction around the cylindrical portion and a second portion spirally wrapped in a second direction inside the cylindrical portion, wherein the first and second portions of the wire are interconnected by a substantially 180° bend disposed in the gap, and whereby said tabs lock said wire on said reel and said substantially 180° bend rotates with said reel.

50.

51. The apparatus of claim 49 further comprising a spring biasing the reel in a direction tending to wind up the first portion of the wire.

52. The apparatus of claim 51 wherein the spring is spaced from the wire.

53. The apparatus of claim 52 wherein:
the reel has a disc portion adjacent to the cylindrical portion; and
the wire and spring are disposed on opposite sides of the disc portion.

54. The apparatus of claim 49 wherein:
the housing defines first and second openings therein;
the first portion of the wire extends through the first opening; and
the second portion of the wire extends through the second opening.

55. The apparatus of claim 54 wherein the housing comprises:
a cylindrical portion; and
a side wall; and
further comprising a cover positioned adjacent to an end of the cylindrical portion of the housing opposite the side wall thereof.

56. The apparatus of claim 55 wherein the first opening is defined in the cylindrical portion of the housing and extends generally tangentially thereto.

57. The apparatus of claim 56 wherein the second opening is defined between the housing and the cover.

58. The apparatus of claim 57 wherein the second opening is substantially perpendicular to an axis of the housing.

59. The apparatus of claim 58 wherein the second portion of the wire extends through the slot and is substantially perpendicular to the cover.

60. The apparatus of claim 59 wherein the second portion of the wire has a series of bends therein including a 90° bend, a 180° and another 90° bend.

61. The apparatus of claim 54 further comprising a brush disposed in the first opening and in wiping contact with the first portion of the wire.

62. The apparatus of claim 54 wherein the second portion of the wire comprises a 90° bend, a 180° bend and another 90° bend therein such that an end of the second portion is substantially perpendicular to an end of the first portion of the wire.

* * * * *

UNITED STATES PATENT AND TRADEMARK OFFICE
CERTIFICATE OF CORRECTION

| | | |
|---|---|---|
| PATENT NO. | : 7,172,150 B1 | Page 1 of 1 |
| APPLICATION NO. | : 10/627410 | |
| DATED | : February 6, 2007 | |
| INVENTOR(S) | : Donald E. Hutchison, II et al. | |

It is certified that error appears in the above-identified patent and that said Letters Patent is hereby corrected as shown below:

<u>Column 9,</u>
Claim 4, line 8, insert --wire-- between "the" and "is".

<u>Column 12,</u>
Claim 50, line 15, after "50." insert --The apparatus of claim 50 wherein said first and second directions are opposite one another.--

Signed and Sealed this

Tenth Day of July, 2007

JON W. DUDAS
*Director of the United States Patent and Trademark Office*